United States Patent
Juels et al.

(10) Patent No.: US 9,160,539 B1
(45) Date of Patent: *Oct. 13, 2015

(54) METHODS AND APPARATUS FOR SECURE, STEALTHY AND RELIABLE TRANSMISSION OF ALERT MESSAGES FROM A SECURITY ALERTING SYSTEM

(75) Inventors: Ari Juels, Brookline, MA (US); Nikolaos Triandopoulos, Arlington, MA (US); Kevin Bowers, Melrose, MA (US); Catherine Hart, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,981

(22) Filed: Jun. 29, 2012

(51) Int. Cl.
 H04L 9/32 (2006.01)
(52) U.S. Cl.
 CPC ............ *H04L 9/3244* (2013.01); *H04L 9/3281* (2013.01)
(58) Field of Classification Search
 CPC ... H04L 41/069; H04L 41/0631; H04L 63/16; H04L 63/20; H04L 63/1416; H04L 63/1425; G06F 21/554; G06F 21/606
 USPC .................. 713/150–152, 160, 161, 168, 176
 See application file for complete search history.

(56) References Cited

U.S. PATENT DOCUMENTS

| | | | | |
|---|---|---|---|---|
| 8,788,817 | B1 * | 7/2014 | Juels et al. ..................... | 713/168 |
| 2002/0046275 | A1 * | 4/2002 | Crosbie et al. ................. | 709/224 |
| 2003/0014664 | A1 * | 1/2003 | Hentunen ....................... | 713/200 |
| 2004/0049693 | A1 * | 3/2004 | Douglas ......................... | 713/200 |
| 2004/0123116 | A1 | 6/2004 | Jin et al. | |
| 2005/0124288 | A1 | 6/2005 | Karmi et al. | |
| 2005/0147110 | A1 * | 7/2005 | Connor .......................... | 370/412 |
| 2006/0112175 | A1 * | 5/2006 | Sellers et al. .................. | 709/223 |

(Continued)

FOREIGN PATENT DOCUMENTS

WO    WO 2011144554 A1 * 11/2011

OTHER PUBLICATIONS

U.S. Appl. No. 13/249,957, filed Sep. 30, 2011, entitled "Methods and Apparatus for Secure and Reliable Transmission of Message Over a Silent Alarm Channel."

(Continued)

*Primary Examiner* — Joseph P Hirl
*Assistant Examiner* — Kalish Bell
(74) *Attorney, Agent, or Firm* — Ryan, Mason & Lewis, LLP (57) ABSTRACT

Methods and apparatus are provided for secure transmission of alert messages over a message locking channel. An alert message is transmitted from a Security Alerting System indicating a potential compromise of a protected resource by obtaining the alert message from the Security Alerting System; authenticating the alert message using a secret key known by a server, wherein the secret key evolves in a forward-secure manner; storing the authenticated alert message in a buffer; and transmitting the buffer to the server. The alert message is authenticated by digitally signing the alert message or applying a message authentication code and is possibly encrypted using a secret key known by a server, wherein the secret key evolves in a forward-secure manner. The authenticated alert message can be maintained in the buffer after the transmitting step. The buffer optionally has a fixed-size and alert messages can be stored in a round-robin manner, for example, from a random position. The buffer can be encrypted prior to transmission to the server.

52 Claims, 8 Drawing Sheets

(56) References Cited

U.S. PATENT DOCUMENTS

| | | | |
|---|---|---|---|
| 2007/0033397 A1 | 2/2007 | Phillips, II et al. | |
| 2007/0097982 A1* | 5/2007 | Wen et al. | 370/394 |
| 2007/0116266 A1 | 5/2007 | Greco et al. | |
| 2007/0261061 A1* | 11/2007 | Staniford et al. | 719/318 |
| 2007/0266435 A1* | 11/2007 | Williams et al. | 726/22 |
| 2008/0037791 A1 | 2/2008 | Jakobsson | |
| 2008/0244694 A1* | 10/2008 | Neystadt et al. | 726/1 |
| 2009/0126002 A1* | 5/2009 | Vail et al. | 726/12 |
| 2009/0259715 A1* | 10/2009 | Xiao et al. | 709/203 |
| 2009/0276621 A1 | 11/2009 | Matsuo | |
| 2009/0323972 A1 | 12/2009 | Kohno et al. | |
| 2010/0058077 A1 | 3/2010 | Matsuda et al. | |
| 2010/0195538 A1* | 8/2010 | Merkey et al. | 370/255 |
| 2010/0287615 A1* | 11/2010 | Martin et al. | 726/23 |
| 2011/0055925 A1* | 3/2011 | Jakobsson | 726/25 |
| 2011/0063111 A1* | 3/2011 | Habib et al. | 340/552 |
| 2011/0096862 A1* | 4/2011 | Kuri et al. | 375/295 |
| 2011/0119487 A1* | 5/2011 | Alexander et al. | 713/160 |
| 2012/0254416 A1* | 10/2012 | Fake et al. | 709/224 |
| 2013/0014264 A1* | 1/2013 | Kennedy et al. | 726/25 |
| 2013/0086392 A1* | 4/2013 | Pogmore | 713/189 |
| 2014/0149744 A1* | 5/2014 | Brier et al. | 713/171 |

OTHER PUBLICATIONS

U.S. Appl. No. 13/334,709, filed Dec. 23, 2011, entitled "Methods and Apparatus for Generating Forward Secure Pseudorandom Numbers."

U.S. Appl. No. 13/404,788, filed Feb. 24, 2012, entitled "Methods and Apparatus for Silent Alarm Channels Using One-Time Passcode Authentication Tokens."

Holt, Logcrypt Forward Security and Public Verification for Secure Audit Logs, Fourth Australasian Information Security Workshop (AISW—NetSec 2006), pp. 1-9.

Yavuz et al., Hash-Based Sequential Aggregate and Forward Secure Signature for Unattended Wireless Sensor Networks, Mobile and Ubiquitous Systems: Networking & Services, MobiQuitous, 2009. MobiQuitous '09. 6th Annual International. IEEE, 2009, pp. 1-10.

Lu et al., Authenticated Encryption Protocol with Perfect Forward Secrecy for Mobile Communication, 2006, Wiley & Son Ltd, 2006, 273-281.

Bellare et al., Forward-Security in Private-Key Cryptography, 2003, Springer-Verlag Berlin Heidelberg, pp. 32-42.

Shi et al., Secure Range Queries in Tiered Sensor Network, 2009, IEEE, pp. 945-953.

Mauw et al., Forward Secure Communication in Wireless Sensor Network, 2009, Springer-Verlag Berlin Heidelberg, pp. 32-42.

Di Ma, Practical Forward Secure Sequential Aggregate Signatures, 2008, ACM, pp. 341-352.

Itkis, Forward Security—Adaptive Cryptography: Time Evolution, 2004, Boston University, pp. 1-27.

Canetti et al., Forward-Secure Public-Key Encryption Scheme, 2003, Eurocrypt, pp. 1-26.

\* cited by examiner

1. Initiate an authenticated encryption scheme by running $\sigma_{AE} \leftarrow \text{AEKeyGen}(1^\kappa)$.
2. Initiate a low layer FS-PRNG scheme (to be used for producing the sequence of forward-secure pseudorandom numbers $r = (r_0, r_1, r_2...)$) by running $(s_0, \sigma) \leftarrow \text{GenKey}(1^\kappa)$.
3. Initiate a high layer FS-PRNG scheme (to be used for producing the sequence of forward-secure pseudorandom numbers $r' = (r'_0, r'_1, r'_2...)$) by running $(s'_0, \sigma') \leftarrow \text{GenKey}(1^\kappa)$.
4. Create the first pseudorandom numbers by running $(r_0, s_1) \leftarrow \text{Next}_\sigma(s_0, 1)$ and $(r'_0, s'_1) \leftarrow \text{Next}_{\sigma'}(s'_0, 1)$.
5. Set $\sigma_{w,0} = \sigma_{r,0} = (r_0, s_1, r'_0, s'_1, 0, 0)$, $\sigma_w = \sigma_r = (\sigma, \sigma')$ and $pk = \sigma_{AE}$.
6. Return $((\sigma_{w,0}, \sigma_{r,0}), (\sigma_w, \sigma_r), pk)$.

1. If $t \leq 0$, then return $(r_i, r'_j, i, j)$.
2. If $b =$ low then
   (a) Create the next low layer pseudorandom number by running $r_{i+t} \leftarrow \text{Next}_\sigma(r_i, t)$.
   (b) Delete $r_i$.
   (c) Return $(r_{i+t}, r'_j, i+t, j)$.
3. If $b =$ high then
   (a) Create the next high layer pseudorandom number by running $r_{j+t} \leftarrow \text{Next}_{\sigma'}(r_j, t)$.
   (b) Delete $r_j$.
   (c) Return $(r_i, r'_{j+t}, i, j+t)$.

FIG. 7

Algorithm 1 OPERATION WRITE

Input: secret key $(r_i, r'_j, i, j)$, message $m \in \{0, 1\}^*$, buffer $C$
Output: new secret key $(r_{i+1}, r'_j, i+1, j)$, updated buffer $C$
1) $c \leftarrow \text{AuthEnc}_{r_i}(m)$
2) $C[C[T]] = (c, i)$
3) $C[T] = C[T] + 1 \mod T$
4) $(r_{i+1}, r'_j, i+1, j) \leftarrow \text{KEvolve}(r_i, r'_j, i, j, 1, \text{low})$
5) delete $r_i$
6) return $[(r_{i+1}, r'_j, i+1, j), C]$

FIG. 8

Algorithm 2 OPERATION WRAP

Input: secret key $(r_i, r'_j, i, j)$, buffer $C$
Output: new secret key $(r_{i+1}, r'_j, i+1, j)$, encaps. buffer $\hat{C}$
1) $c' \leftarrow \text{AuthEnc}_{r'_j}(C)$
2) $\hat{C} = (c', j)$
3) $(r_i, r'_{j+1}, i, j+1) \leftarrow \text{KEvolve}(r_i, r'_j, i, j, 1, \text{high})$
4) delete $r'_j$
5) return $[(r_i, r'_{j+1}, i, j+1), \hat{C}]$

Algorithm 3 OPERATION READ

---

Input: secret key $(r_i, r'_j, i, j)$, encapsulated buffer $\hat{C}$
Output: new secret key $(r_l, r'_{j'}, l, j')$, $(m_0, \ldots, m_{T-1})$ 1) if $j' \leq j$ then return $[(r_i, r'_j, i, j), \perp]$
2) $(r_i, r'_{j'}, i, j') \leftarrow \text{KEvolve}(r_i, r'_j, i, j, j' - j, \text{high})$
3) $C \leftarrow \text{AuthDec}_{r'_{j'}}(c')$
4) if $C = \perp$ then return $[(r_i, r'_j, i, j), \perp]$
5) (View $C$ as an array $C[0], C[1], \ldots, C[T-1], C[T]$)
   $I = C[T]; x = 0$
6) for $0 \leq k < T$ do
   a) $(c, l) = C[k+I \bmod T]$
   b) if $l \leq i$ then return $[(r_i, r'_j, i, j), \perp]$
   c) if $k = 0$ then $x = l$ else
      i) if $l \neq x + 1$ then return $[(r_i, r'_j, i, j), \perp]$
      ii) $x = l$
   d) $(r_l, r'_{j'}, l, j') \leftarrow \text{KEvolve}(r_i, r'_{j'}, i, j', l - i, \text{low})$
   e) $m_k \leftarrow \text{AuthDec}_{r_l}(c)$
7) return $[(r_l, r'_{j'}, l, j'), (m_0, \ldots, m_{T-1})]$

METHODS AND APPARATUS FOR SECURE, STEALTHY AND RELIABLE TRANSMISSION OF ALERT MESSAGES FROM A SECURITY ALERTING SYSTEM

CROSS-REFERENCE TO RELATED APPLICATIONS

The present application is related to U.S. patent application Ser. No. 13/249,957, filed Sep. 30, 2011, entitled "Methods and Apparatus for Secure and Reliable Transmission of Messages Over a Silent Alarm Channel" (now U.S. Pat. No. 8,788,817); U.S. patent application Ser. No. 13/334,709, filed Dec. 23, 2011, entitled "Methods and Apparatus for Generating Forward Secure Pseudorandom Numbers," (Now U.S. Pat. No. 9,008,303); and U.S. patent application Ser. No. 13/404,788, filed Feb. 24, 2012, entitled "Methods and Apparatus for Silent Alarm Channels Using One-Time Passcode Authentication Tokens," each incorporated by reference herein.

FIELD OF THE INVENTION

The present invention relates generally to techniques for secure transmission of messages over a network or other types of communication systems.

BACKGROUND OF THE INVENTION

Security Alerting Systems (SASs) generate alerts that signal a compromise of a computing device. The alerts are transmitted to a trusted receiver for analysis and action. An SAS can be, for example, a Host-based Intrusion Detection System (HIDS), an anti-virus engine, or any software facility that can write to a system log (syslog) or an event interface and is capable of reporting events to a remote service. In a further variation, the SAS could be a dedicated Network Intrusion Detection System (NIDS), or, in an embedded device, a logical functionality that reports physical tampering. An SAS helps detect both incipient intrusions and host compromise after the fact. An SAS also gathers essential evidence for post-breach forensics. As a main intelligence source for current Security and Information Event Management (SIEM) systems, SASs play a key role in broad IT defense strategies.

Current-generation SASs, however, lack key protections against sophisticated attackers. They do not effectively prevent discovery by an attacker of whether or not its activities have been detected. By observing host emissions on a network prior to compromise, for example, an attacker can determine if an SAS is transmitting alerts. After a host is compromised, an attacker can observe host instrumentation, e.g., a HIDS rule set, as well as logs, buffered alerts, and so forth, giving further evidence of whether the activities of the attacher are likely to have been observed.

Additionally, an attacker can undetectably suppress or tamper with alert messages in most existing SASs. Most SASs transmit alerts to a remote server on the fly. By disrupting such transmissions, an attacker can cause critical alert messages to be lost. Even a reliable transport layer (e.g., through TCP) is vulnerable. An attacker can delay alert transmission (via, e.g., a host-directed Denial of Service attack) until it fully compromises a target host and breaks off SAS communications. Furthermore, logged or buffered SAS alerts are vulnerable to deletion or modification after a host is compromised.

To understand the ramifications of message suppression, consider, for instance, a rootkit Trojan that exploits a host vulnerability to achieve a privilege escalation on an enterprise server. The privilege escalation might be detected immediately by a HIDS or anti-virus engine, resulting in logging an alert, "privilege escalation." Yet, many rootkits today modify or remove critical logs related to the installation or running of this code. Thus, if the "privilege escalation" alert remains buffered in a log on the host, the Trojan can simply delete the alert as soon as it gains full system control. An enterprise SIEM system, then, that later collects the set of transmitted logs, will fail to observe the alert, and thus to detect the Trojan. In addition, as indicated above, on-the-fly alert transmission carries its own problems.

Thus, the abilities of an attacker to discover SAS behavior and to perform undetectable alert suppression in existing SAS systems are fundamental vulnerabilities in the chain of custody between hosts and servers. Attacks against enterprises in the shape of Advanced Persistent Threats (APTs) have recently been growing noticably in sophistication. Insecure SAS chains of custody, therefore, pose an escalating systemic vulnerability.

A need therefore exists for transmitting alert messages from a security alerting system to a monitoring server.

SUMMARY OF THE INVENTION

The present invention in the illustrative embodiments described herein provides methods and apparatus for secure transmission of alert messages over a message locking channel. According to one aspect of the invention, an alert message is transmitted from a Security Alerting System indicating a potential compromise of a protected resource by obtaining the alert message from the Security Alerting System; authenticating the alert message using a secret key known by a server, wherein the secret key evolves in a forward-secure manner; storing the authenticated alert message in a buffer; and transmitting the buffer to the server. The alert message is authenticated by digitally signing the alert message or applying a message authentication code (MAC). The alert message may additionally be encrypted using the above secret key.

In one exemplary embodiment, the authenticated alert message is maintained in the buffer after the transmitting step. The buffer optionally has a fixed-size and a plurality of the alert messages can be stored in the buffer in a round-robin manner, for example, from a random entry in the buffer. The buffer is optionally encrypted prior to transmission to the server.

According to another aspect of the invention, sequence numbers of a plurality of the alert messages are evaluated to detect a gap in the alert messages. A gap rule failure can be detected if the server receives two consecutive non-overlapping buffers.

According to another aspect of the invention, a system is provided for transmitting an alert message from a Security Alerting System indicating a potential compromise of a protected resource. The system comprises a bufferer for (i) obtaining said alert message from an alerter that generates said alert message if one or more predefined alert rules are violated; (ii) authenticating and possibly encrypting said alert message using a secret key known by a server, wherein said secret key evolves in a forward-secure manner; and (iii) storing said authenticated and possibly encrypted alert message in a buffer; and a transmitter for transmitting said buffer to said server, wherein the buffer is further encrypted before transmission and said server comprises a receiver for receiving said buffer from said transmitter and a decrypter for processing said buffer.

The communication techniques of the illustrative embodiments overcome one or more of the problems associated with the conventional techniques described previously, and permit devices to securely transmit alert messages from a Security Alerting System. Moreover, no modification of the applications or communication protocols is required. Among other benefits, the alert messages permit real-time detection of the potential compromise of the protected resource. These and other features and advantages of the present invention will become more readily apparent from the accompanying drawings and the following detailed description.

DETAILED DESCRIPTION

The present invention provides methods and apparatus for secure transmission of alert messages over a message locking channel.

The disclosed message-locking channel offers a secure chain of custody in an SAS, concealing alerting activity and ensuring against alert suppression or tampering. The disclosed message-locking channel provides security in a strong attack model; protecting a host-to-server chain of custody even after a host has been compromised.

According to one aspect of the invention, the message-locking channels buffer alert messages on the host. Host-based buffering enables regular, periodic alert transmission, reducing alert discovery opportunities on the network while also helping bypass attacker alert-blocking attempts.

The disclosed message-locking channels secure alert messages and ensure their delivery (or a telltale delivery-failure) after compromise, while they are still buffered on the host. Messages must be protected against deletion and tampering on a device that the attacker controls, i.e., they need integrity. Messages also need to be concealed. Concealment necessitates more than confidentiality. To ensure that an attacker cannot learn whether an SAS has detected the presence of the attacker, it should not be possible to even learn whether there are any buffered alert messages at all (i.e., stealthiness). As discussed hereinafter, the problem of message integrity is largely addressed with an existing technique referred to as forward-secure logging, in which message-signing keys are continuously generated and then discarded after use, so messages cannot be replaced.

A message-locking channel (MLC) provides forward-secure integrity and encryption. By combining cryptographic protections with a data structure and buffer transmission protocol that are invariant to the number of alert messages and their buffering history, the MLCs also provide stealthiness.

Challenges

SASs are an important backstop for host-based intrusion defenses. As a security exploit unfolds on a host, the exploitation often produces strong indications visible to resident security software. Effective host countermeasures, however, are hard to achieve. The risk of false positives makes blanket service interruption impractical, while focused defenses rarely protect against unidentified or previously unknown threats. In other words, Intrusion Prevention Systems (IPSs) are often ineffective.

Consequently, an SAS transmits security alerts to a remote, trusted service. This remote service can perform analysis and remediation that is impractical on hosts themselves. As the remote service operates on a device other than the host, the remote service is generally insulated from the intrusion. Additionally, the remote service can correlate events across multiple reporting hosts, enabling it to filter out false positives. The remote service can also house sensitive threat intelligence that can not be safely exposed on hosts and can trigger action by human system administrators or Security Operations Center (SOC) personnel.

Figure 1:
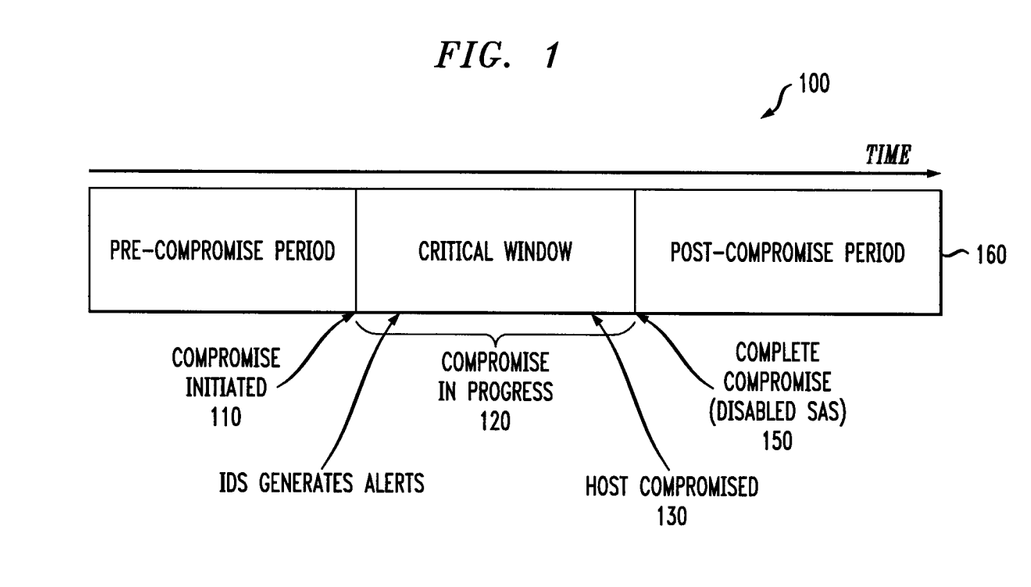
FIG. 1 illustrates an event timeline during the compromise of a host.

FIG. 1 illustrates an event timeline 100 during the compromise of a host. An SAS can only start generating meaningful alerts, of course, once an intrusion is in progress during a time period 120 (beginning at a time 110 when the compromise is initiated). After an intruder has compromised a host at a time 130, i.e., obtained high-level privileges, the intruder can shut down the SAS or arbitrarily modify its outputs. An attacker's takeover of a host and its resident SAS system is referred to as a complete compromise at a time 150. Thus, an SAS produces valid and trustworthy alerts only after intrusion initiation 110 but prior to complete compromise 150. This time interval 120 is referred to as the critical window of an attack.

Buffering

SASs typically push alerts to a remote server in real time, and thus secure them at the server during the critical window 120. Such real-time pushing, when successful, prevents an adversary from tampering with alert messages after complete compromise, as they have already left the host. There is a range of important cases, though, both adversarial and benign, in which pushing alerts is not viable in an SAS. To begin with, SAS messages often cannot be pushed reliably on the fly, for two main reasons: imperfect connectivity (e.g., corporate laptops shuttling between an office and home may have limited connection with corporate security servers) and network attacks (e.g., an attacker causing malicious network failures). Moreover, even if reliable, immediate SAS message-pushing were generally feasible, say by routing each alert message over IPsec and deleting the message after delivery was acknowledged, there are more problems.

If a host pushes alerts instantaneously, then its outbound traffic reveals SAS activity to an attacker monitoring its output. An attacker can then probe a host to learn undetectable events in advance or determine after the fact whether its intrusion into a host was detected. Traffic analysis alone can reveal SAS rule-triggering. In addition, existing SASs generally attempt to push alerts "onto the wire" as quickly as possible. Doing so removes them from a host under attack and secures them in the custody of a trusted server. It is instead faster, however, to secure alerts in a cryptographically protected buffer on the host.

Buffering SAS messages, however, poses a security challenge. If an attacker completely compromises a host, there is no way of course to prevent it from disabling an SAS or tampering all of its future outputs. Buffered SAS messages may be vulnerable to three kinds of retroactive attacks:

(i) Modifying Buffered SAS Messages: Any alert messages buffered in the critical window 120 of an attack and resident post-compromise can be tampered with by an attacker. For instance, an attacker can replace a potentially important indicator (e.g., "privilege escalation") with a more benign one (e.g., "port scan observed").

(ii) Discovering SAS Rules and/or Alert-Generation Times: In many threat scenarios, security administrators aim to conceal SAS attack signatures or behavioral rules from intruders. For example, source IP addresses can help identify an attacker, but if an attacker learns they are in use, the attacker can just avoid them. A simple means of concealing an SAS rule is to erase it when it is triggered. Even if messages are encrypted and rules erased, however, an attacker who has monitored past buffer transmissions can potentially still discover SAS rules (by inspecting the state of the buffer the attacker can infer that some SAS rule has been triggered, and thus that its intrusion was detected/detectable).

(iii) Blocking SAS Transmission: Once a host is compromised, an adversary can block the transmission of buffered messages (or simply purge them).

These three attacks can undermine the value of alerts generated by an SAS precisely at its peak of visibility into a compromise, namely during the critical window 120. As log-scrubbing malware has already emerged in the wild, alert modification is a real threat. Protecting against these attacks is the main technical hurdle overcome in the design of the message-locking channels.

Message-Locking Channels

The exemplary disclosed message-locking channels (MLC) confer three properties on messages inserted into the channel via a host-side buffer:

(i) Integrity: Even after compromising a host and learning its full state (including cryptographic keys), an adversary cannot modify, reorder, or otherwise tamper with buffered messages without detection. Note that a digital signature (or message-authentication code (MAC)) alone, does not achieve this property: An adversary learns the signing key after host compromise and can forge messages. That is why forward security is an important part of the MLC.

(ii) Stealthiness: An adversary cannot tell what messages are present in an MLC buffer, i.e., messages enjoy confidentiality. But the stealthiness property of an MLC is even stronger than confidentiality: A powerful adversary, one that intercepts all host-to-server transmissions prior to compromise and learns the full state of the host after compromise, cannot tell if any messages have been inserted into the buffer.

(iii) Persistence: Buffer contents may be retransmitted an arbitrary number of times without loss of forward-secure integrity or stealthiness, ensuring that even isolated alert messages of rare events eventually reach the trusted service despite possible transmission failures.

Figure 2A:
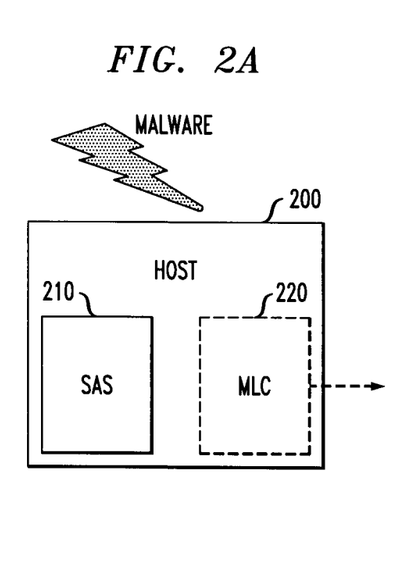
FIGS. 2A through 2C illustrate a number of compromise phases for a host having a Security Alerting System and a message-locking channel that incorporates aspects of the present invention.
Figure 2B:
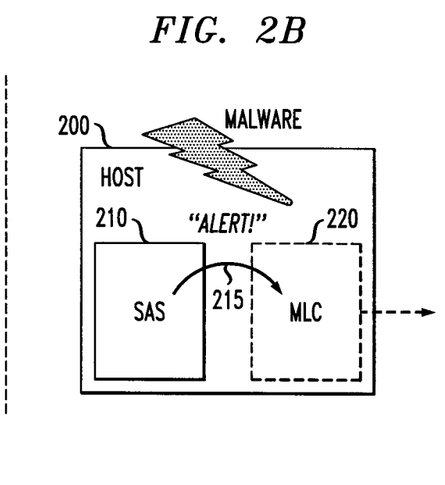
Figure 2C:
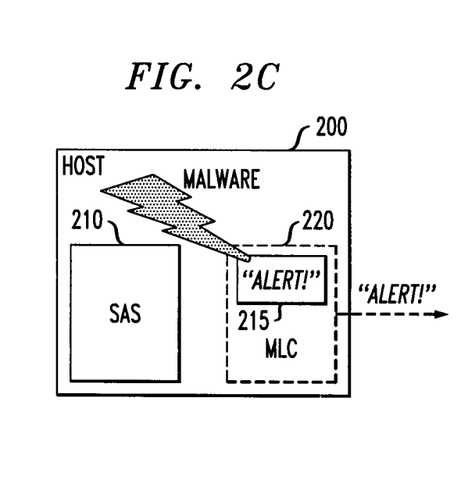

FIGS. 2A through 2C illustrate a number of compromise phases for a host 200 having an SAS 210 and a message-locking channel 220 that incorporates aspects of the present invention. FIG. 2A illustrates a pre-compromise phase, where the intruder has not yet attacked the host 200. FIG. 2B illustrates the critical window 120, where the SAS 220 detects impending compromise and generates an alert 215 that is sent to the MLC 220. FIG. 2C illustrates a post-compromise phase 160, where the intruder has complete control of the host 200, but the MLC 220 securely stores and transmits the alert 215.

An MLC 220 is agnostic to the functionality of the SAS 210. In particular, the MLC 220 is agnostic to what messages are emitted by the SAS 210. The MLC 220 gives an SAS 210 the potential to emit alerts more effectively and securely within the critical window 120.

According to one aspect of the invention, an SAS 210 is combined with an MLC 220 on a host 200. The SAS 210 generates alert messages that are inserted into the MLC 220 for delivery to the remote server. This is typically most useful when message insertion happens within the critical window 120 of an attack. In the post-compromise period 160, the MLC 220 successfully delivers the messages inserted by the SAS 210 (potentially on a continuing or persistent basis). Otherwise, the remote server observes a break in communication (alerting the remote server to a potentially critical security event). Briefly, then, the MLC 220 ensures either eventual delivery of SAS alerts or a visible delivery failure.

Architecture

An exemplary general architecture uses an MLC 220 to secure the host-to-server chain of custody in an SAS system. The MLC, as indicated above, implements a low-level crypto-assisted reliable channel that, even under adversarial conditions, ensures intact and stealthy delivery of transmitted messages to a remote server.

Being agnostic to message content, an MLC 220 can work with any SAS 210. The MLC 220 can serve as the main channel for SAS messages or can deliver SAS messages selectively and work in parallel with an existing transport layer. Exactly how SAS messages are produced at the host 200 or consumed at the receiving server depends on SAS instrumentation and alert-consuming processes. As such, it is outside the scope of the present invention.

In modern enterprises, many SAS-based security controls exist across a network to alert upon malfeasance. Typically, these alerts are sent via unprotected TCP/IP transmission mechanisms, such as the syslog protocol (which uses UDP by default and is, therefore, unreliable), the Simple Network Messaging Protocol (SNMP), or the Internet Control and Messaging Protocol (ICMP). These alerts are typically generated by endpoint software on host systems (such as anti-virus, anti-malware, or HIDS) or by networked security control devices. Once installed, these devices are usually managed through a console technology, such as SIEM systems, with the details monitored on a continuous basis. The exemplary embodiment considers a generic SAS-instrumented host communicating with a server (over a possibly unreliable channel).

Figure 3:
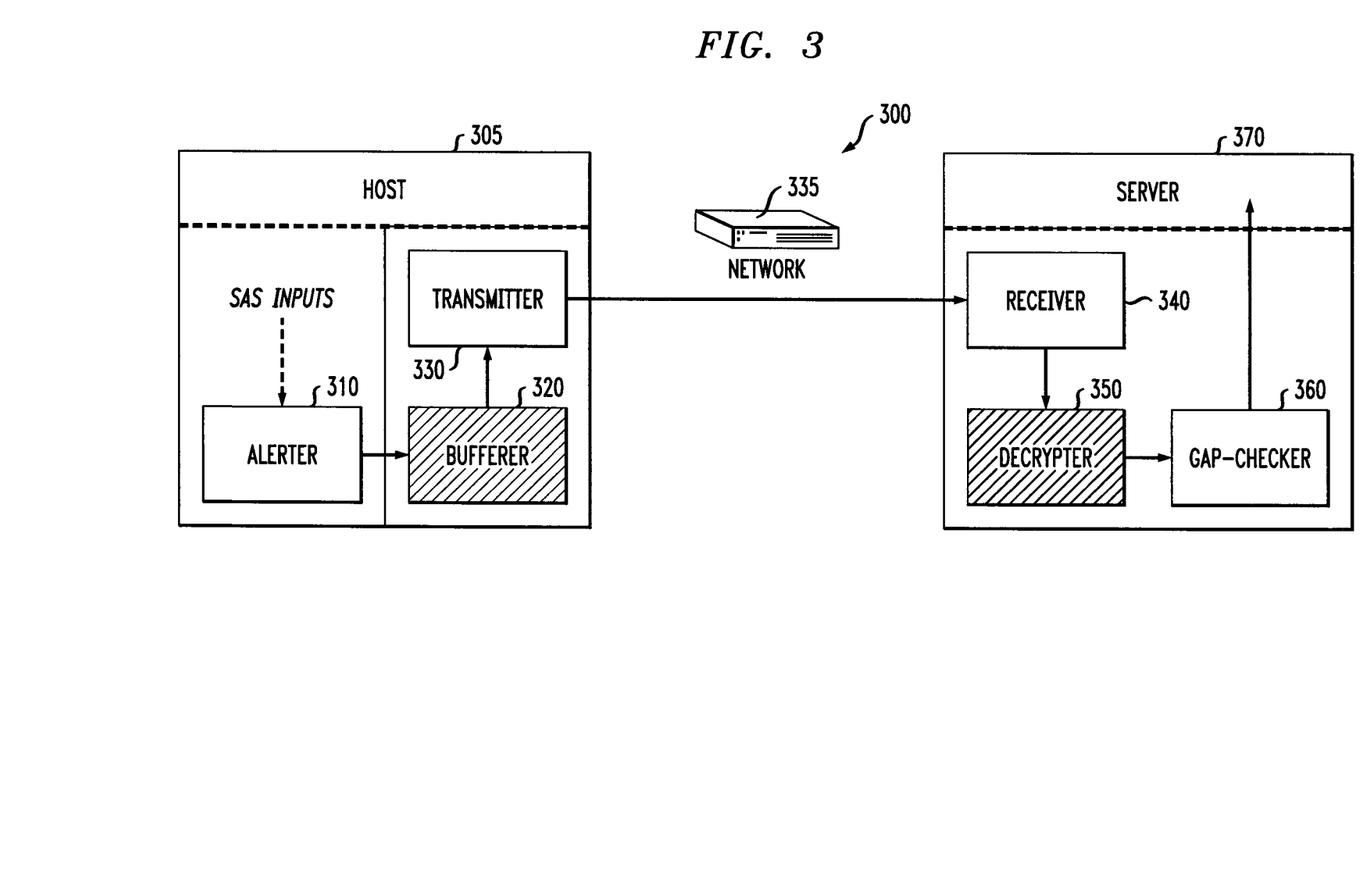
FIG. 3 illustrates an exemplary network environment that incorporates aspects of the present invention.

FIG. 3 illustrates an exemplary network environment 300 that incorporates aspects of the present invention. As discussed hereinafter, the message-locking channel 220 comprises a bufferer 320 and a decrypter 350.

The SAS components that generate alert messages are generally referred to in FIG. 3 as an alerter module 310. Generally, the alerter module 310 monitors the environment of a host 305 to identify events that match one of a set of specified alert rules. When an event triggers a rule, the alerter 310 outputs a distinct alert message. An alert template may either be static (predefined at some setup time for the host 305) or dynamic (updated regularly or on-demand through communication with the server 370). Rules may take any form. Rules may test individual state variables (specified as what is generally called a signature) or they may correlate more than one event via a complicated predicate or classifier. Moreover, as the present invention supports stealthy erasure of rules, it permits enhanced functionality in the alerter 310. The alerter 310 may tag select rules as "vanishing." When such a rule is triggered, the rule is erased from the current rule set.

The alerter 310 interface is unidirectional. The alerter 310 outputs alert messages, that are consumed by the message-locking channel. Although many architectures are possible, given the emphasis on critical alerts, in a canonical operational setting, the SAS 210 may send only high severity messages (e.g., those that seem to indicate impending compromise) through the message-locking channel, and other less critical messages through an ordinary low-priority transport layer. This high-priority channel will carry less traffic and thus will impose lower overhead due to buffer retransmissions.

As shown in FIG. 3, a bufferer module 320 controls the MLC core message buffer. The bufferer 320 receives messages from the alerter 310 and inserts them into the buffer. The bufferer 320 also receives buffer-wrapping requests from the transmitter 330 (see below) and responds by returning the current buffer contents in a securely encapsulated form, as discussed further below in a section entitled "Message-Locking Channel." The bufferer module 320 is also responsible for maintaining the secret state of the MLC and updating cryptographic keys. The exemplary bufferer 320 accepts two calls. A Write call, as discussed further below in conjunction with FIG. 7, from the alerter 310 to insert a message to the MLC buffer and a Wrap call, as discussed further below in conjunction with FIG. 8, from the transmitter 330 requesting encapsulated export of the buffer contents. The bufferer 320 does not discard messages from the buffer when they are transmitted. A message keeps being encapsulated and transmitted until it is overwritten. This is the feature of persistence that helps overcome adversarial network disruptions.

A transmitter module 330 schedules and executes buffer transmissions from the host 305 to the server 370. In a basic implementation, transmissions may be scheduled at regular intervals of time as a "heartbeat." The transmitter module 330 sends Wrap requests to the bufferer 320 and transmits encapsulated buffers to the server 370 over the network 335 using any suitable protocol.

A receiver module 340 receives encapsulated-buffer transmissions on the server 370 from the host-based transmitter 330 over the network 335. When the receiver module 340 receives a transmission pushed from the host 305, the receiver module 340 relays it with a Read instruction to a decrypter 350.

The decrypter 350, in response to a Read request, as discussed further below in conjunction with FIG. 9 from the receiver 340, performs cryptographic unwrapping and processing of the accompanying encapsulated buffer. The decrypter 350 verifies the integrity of the buffer and either outputs its constituent messages, or else outputs a ⊥ symbol indicating a buffer corruption. The decrypter 350 labels messages with their (verified) buffer sequence numbers.

A gap-checker 360 looks for lost messages in the SAS message stream, which cause it to output an alert referred to as a gap alert. Gap alerts may be caused by one of two things: (1) Dropped or suppressed buffers or (2) Overwriting of alerts in the buffer by malicious buffer-stuffing on the compromised host 305, as discussed further below.

As buffer messages are labeled with verified sequence numbers, gap checking requires verification that no sequence numbers go missing in the message stream. Because messages continue to be transmitted until overwritten, note that in normal operation sequence numbers will generally overlap between buffers. The gap-checker 360 can optionally filter out redundant messages.

To detect an adversary that suppresses buffer transmission completely, the gap-checker 360 also issues a gap alert if buffers have stopped arriving for an extended period of time, as discussed below.

The gap checker 360 detects when a true gap occurs, i.e., there are no false-negatives in its gap-alert output. To ensure a low false-positive rate, i.e., to prevent spurious detection of maliciously created gaps, calibration is required.

The size T of the MLC buffer dictates a tradeoff between the speed at which alerts can be written to the buffer and the rate at which they must be sent to the host 305. Let $\tau$ denote an estimate of the maximum number of alerts written by the host 305 per second under normal (non-adversarial) conditions. Then, provided that the encapsulation interval (the period between "snapshots" of buffers received by the server 370) is at most $T/\tau$ seconds, a normal host will not trigger a false gap alert.

To accommodate normal network disruptions as well as adversarial attempts to block network messages, use of the persistence feature of the MLC is desirable. This means a transmission rate or "heartbeat" rate $\mu$ higher than $T/\tau$. When $\mu > kT/\tau$, every message will be transmitted at least k times. If the server 370 successfully receives buffer transmissions at a rate higher than $T/\tau$, the server 370 can downsample for efficiency.

If an attacker suppresses buffer transmission completely, then the gap-checker 360 will cease to receive buffers. This is a detectable event. The gap-checker 360 issues a gap alert if more than $\beta$ seconds have elapsed without the receipt of a buffer, for some choice of $\beta > T/\tau$, as determined by policy.

The maximum SAS message-generation rate, $\tau$, of normal hosts is characterized experimentally below. It has been shown the false-positive gap-alert rate can be driven extremely low with moderate buffer sizes T under non-adversarial conditions.

Adversarial Model

For ease of illustration the MLC is treated as a "lockbox" with a restricted interface and substantially ideal security properties. Recall that the host-side portion of the MLC 220 sits in the bufferer module 320. This module 320 allows only two operations: The writing of a message m and the encapsulation of the full, current buffer contents.

The exemplary MLC buffer is a first-in-first-out (FIFO) buffer with wraparound, and a fixed number T of slots. Any tampering with the buffer or writing of invalid messages causes its contents to be indelibly replaced with a special corruption symbol ⊥ (again, in a cryptographic abstraction). Each encapsulated buffer is labeled with a forward-secure sequence number j, meaning that even after complete compromise, an attacker can only increase it, not decrease it. Each encapsulated buffer also carries the current message sequence number $s_j$; the value $s_j$ mod T points at the current buffer position.

The goal of an adversary on compromising a host 305 is to suppress buffered alerts generated during the critical window 120 of infection. The adversary can do so during the post-compromise period 160 in any of four possible ways:

(i) Buffer Modification or Destruction: The adversary can tamper with the contents of the buffer to suppress critical-window alerts. This tampering, as noted above, will cause the buffer contents to be replaced with a special symbol ⊥.

(ii) Buffer Overwriting: Tampering with MLC contents will produce a detectable message-integrity failure. But an adversary can write messages into the MLC buffer without destroying it. By writing T relatively benign messages, i.e., exploiting buffer wraparound to refill the buffer, it can overwrite and thereby destroy messages generated during the critical window.

(iii) Buffer Dropping: The adversary can simply drop buffers or to delay their transmission.

(iv) Transmission Stoppage: The adversary can break the MLC completely, causing no buffer transmission for an extended period of time, or indefinitely.

During the critical window 120, the adversary has another possible vector of attack. The adversary can try to attack so quickly that the critical window 120 is nearly zero. In this case, there is not sufficient time to take in an SAS alert message and put it in the MLC 220. This line of attack is generally infeasible. For some common, exemplary vectors of attack, the critical window 120 comfortably exceeds the time required to secure associated alert messages.

Countermeasures

Adversarial buffer modification or destruction, as indicated above, is a detectable attack. Adversarial buffer modification or destruction causes the server to receive a symbol ⊥, indicating a cryptographic integrity-check failure.

The gap-checker 360 detects both buffer overwriting attacks and buffer dropping attacks by the same means: It looks for lost messages, as indicated by a gap in message sequence numbers. Expressed alternatively, the gap-checker 360 issues a gap alert when the current sequence numbers $s_j$ and $s_{j'}$ of two successively received buffers are such that $s_{j'} - s_j \geq T$.

Figure 4A:
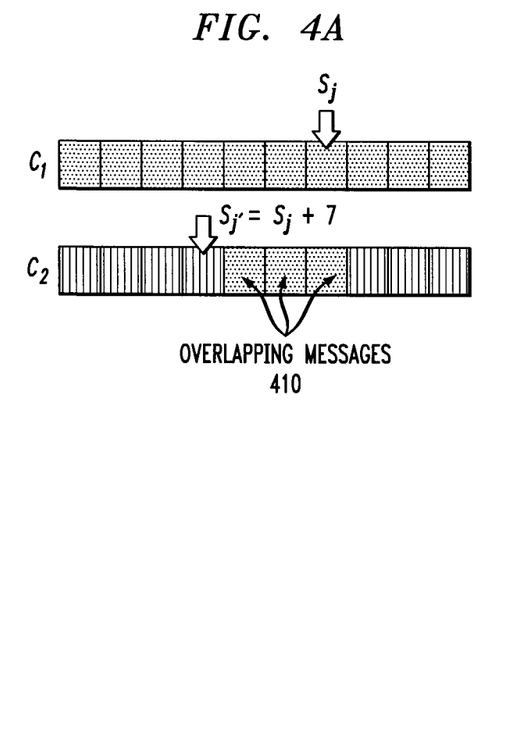
FIG. 4A illustrates a normal buffer transmission and FIG. 4B illustrates a buffer transmission where messages have been lost to buffer overwriting or buffer dropping.
Figure 4B:
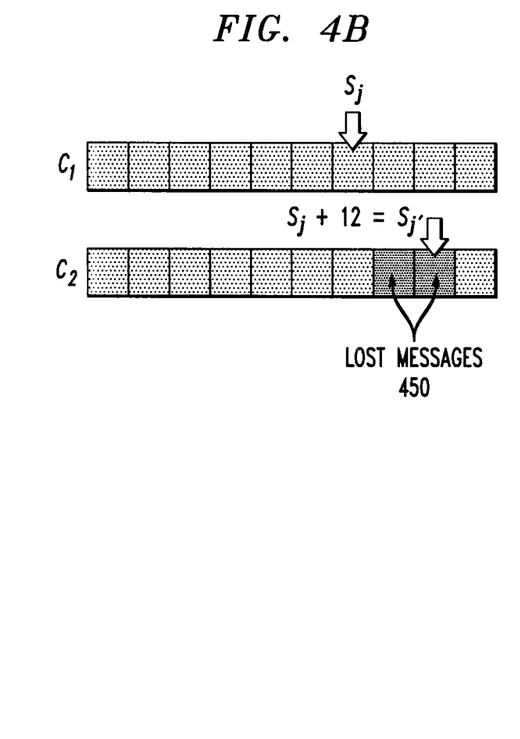

FIG. 4A illustrates a normal buffer transmission and FIG. 4B illustrates a buffer transmission, ostensibly during an attack, in which messages have been lost to buffer overwriting or buffer dropping. As shown in FIG. 4A, two buffers $C_1$, $C_2$ have indices j, j' and T=10, received in succession by the server 370. FIG. 4A depicts normal message overlap 410 between buffers $C_1$ and $C_2$. FIG. 4B depicts a gap, where messages with sequence numbers $s_j+1$ and $s_j+2$ are lost messages 450.

A transmission stoppage, as indicated above, is detectable when the server 370 has received no buffers for an extended period of time, as measured by policy.

Message-Locking Channel

Desired Ideal Functionality MLC can be viewed as a "lockbox" that exports a basic, secure, write/read interface. The lockbox comprises a buffer of fixed size T. The current position $I \in \{0, \ldots, T-1\}$ is an index pointing to the slot where the next message will be written. Index I is initially set to a random position. Then: (1) Messages from a fixed language L may be individually inserted into the buffer by a sender S via operation write in a round-robin fashion: A new message is written in slot I (overwriting the oldest message in the buffer), and I is then incremented by 1 mod T. (i.e., messages are evicted in a FIFO manner.) (2) A receiver R reads the complete buffer via operation read: The output of read is the full sequence of T messages, starting at position I, with wraparound.

This buffer operates as a lockbox in the sense that it satisfies the following key property: Messages can only be modified via the write interface; any other form of modification results in buffer invalidation. More precisely, when read by R, a message $m_i$ corresponding to slot $i \in \{0, \ldots, T-1\}$ is guaranteed to be: (1) The correct message for slot i, that is, the most recent message written to the slot (the empty message Ø if no message was ever written) or (2) A special failure message ⊥ if slot i has been tampered with. Tampering in this case means, i.e., its contents modified by means other than a call to write.

This ideal description of the MLC primitive translates into basic properties: Attack messages can be securely captured in this lockbox at the host 305 and remain integrity-protected and confidential until they reach the receiving server 370. As the buffer size is fixed, its structure reveals no information about past buffer use to an intruder, i.e., the construction offers stealthiness. Finally, as messages are deleted only after T write operations, but are repeatedly produced with every read operation, the write/read interface supports persistent message transmission.

Security Definitions

Let C denote buffer contents at a given point in time, the result of writes to the buffer. Let Ĉ denote a cryptographic encapsulation of C for transmission, the buffer C wrapped for transmission to the receiver R.

First, there are two non-cryptographic properties: Correctness dictates that under normal operation any sequence of messages of size at most T that are added in C by sender S can be correctly produced by receiver R in an order-preserving way; in particular, the T most recent messages of C and their exact order can be accurately produced by R. Persistence means that by encapsulating the buffer C frequently enough, it is possible to produce a given message in C more than once.

For our two cryptographic properties, we consider a powerful adaptive adversary A that operates in two phases: (1) Prior to compromise, A fully controls the network, and may arbitrarily modify, delete, inject, and re-order messages between S and R; A may also determine what messages S writes to its buffer, when S encapsulates and sends the buffer and what messages R receives, and may, additionally, choose its time of a compromise; (2) On compromising S, A corrupts S, learns the secret state of S, and fully controls S going forward.

Immutability means, informally, that any messages written into the buffer C prior to compromise are either received by R without modification and in the order in which they were written, or else dropped or marked as invalid; in other words, even after compromising S, A cannot successfully alter or re-order messages in C.

Stealthiness means, informally, that A cannot learn any information about messages buffered prior to compromise. This property is stronger than confidentiality. A cannot learn the contents of messages, and A also cannot learn the number of buffered messages (or, indeed, if any messages were buffered at all). This lack of information holds even after A has compromised S.

The property of stealthiness is defined through a security experiment analogous to IND-CCA2 (indistinguishability under an adaptive chosen ciphertext attack): A chooses two challenge messages $m_0$, $m_1$; optionally, one may be blank, signifying "no message insertion." For a randomly selected bit b, message $m_b$ is placed in S's buffer just prior to compromise. As noted above, A can learn messages received by R in the pre-compromised phase. An MLC satisfies stealthiness if A cannot guess b with (non-negligible) probability greater than ½.

The exemplary MLC construction uses standard forward-secure cryptographic primitives to secure buffered messages after R's compromise: Secret keys, used in tools providing integrity and confidentiality on transmitted messages, evolve over time so that no current key reveals past ones. Forward security is used to protect the integrity and confidentiality of security logs. Forward security alone cannot achieve stealthiness or persistence. For a more detailed discussion of forward security, see, e.g., U.S. patent application Ser. No. 13/334,709, filed Dec. 23, 2011, entitled "Methods and Apparatus for Generating Forward Secure Pseudorandom Numbers," (Now U.S. Pat. No. 9,008,303), incorporated by reference herein.

In particular, existing forward-secure logging solutions make no attempt to conceal the number of accumulated messages. These solutions employ an append-only, read-once and arbitrary-long buffer. Indeed, (authenticated and/or encrypted) messages are organized in a linked list of arbitrary size, where any new message is added at the end of the list. This append-only technique, however, does not achieve stealthiness: An adversary can infer message-writing behavior from the length of a buffer or transmission. Additionally, in such schemes, a Wrap sends to R all messages in the list, and then deletes them, thus eliminating message persistence, as individual messages can only be transmitted once.

To rectify these limitations, the MLC construction is imbued with the following important design features:
  (i) To enable persistent message delivery, the delete-on-read approach of existing forward-secure logging is avoided. Messages are kept in the buffer until they are overwritten, and then transmitted redundantly.
  (ii) To protect against counting-based inference of message transmission as well as truncation attacks, the append-only structure of existing logging schemes is avoided and a buffer of fixed capacity is used.
  (iii) Two layers of authenticated encryption are employed. The lower layer protects buffered messages after compromise of S. The higher layer protects buffers in transmission: It enforces stealthiness by concealing message updates. An adversary cannot observe the evolution of message ciphertexts: They are themselves freshly encrypted from buffer to buffer.

Detailed Construction

The MLC scheme employs a forward-secure pseudorandom number generator FS-PNG and an authenticated encryption scheme, discussed in the following section entitled "Authenticated Encryption".

Authenticated Encryption

The disclosed scheme for secure transmission of alert messages makes use of authenticated encryption. Six different authenticated encryption modes, namely OCB 2.0, Key Wrap, CCM, EAX, Encrypt-then-MAC and GCM, have been standardized in ISO/IEC 19772:2009 (Authenticated Encryption). Bellare and Namprempre show that an encrypt-then-MAC (Message Authentication Code) scheme provides NM-CPA secrecy and INT-PTXT, provided that the MAC scheme is strongly unforgeable. See, e.g., Mihir Bellare and Chanathip Namprempre, "Authenticated Encryption: Relations among Notions and Analysis of the Generic Composition Paradigm," J. Cryptol., 21:469-491 (2008), incorporated by reference herein.

More formally, in the symmetric key setting, an authenticated encryption scheme is a triple of algorithms AEKeyGen, AuthEnc, AuthDec), as follows:

An AEKeyGen Algorithm takes as input a security parameter and returns a secret key $\sigma_{AE}$ to be used by the encryption and decryption algorithms, expressed as follows:

$$\sigma_{AE} \leftarrow \text{AEKeyGen}(1^\kappa).$$

An AuthEnc Algorithm takes as input the secret key $\sigma_{AE}$ and a message m and returns a ciphertext c, expressed as follows:

$$c \leftarrow \text{AuthEnc}_{\sigma_{AE}}(m).$$

An AuthDec Algorithm takes as input a secret key $\sigma_{AE}$ and a ciphertext c and either returns m or $\bot$, the latter denoting invalid, i.e., non-authenticated, encryption c, expressed as follows:

$$\{m,\bot\} \leftarrow \text{AuthDec}_{\sigma_{AE}}(c).$$

Security of an authenticated encryption scheme is provided by the combined properties of an encryption scheme and a signature scheme (or MAC), i.e., privacy and integrity. That is, if the ciphertext has not been tampered with, decryption returns the original encrypted message, whose confidentiality is protected by the ciphertext. It is again noted that public-key variants are possible, as would be apparent to a person of ordinary skill in the art.

Data Structure

The sender S maintains the following three components of state information:
  1. a secret key $\sigma$ (also kept by the receiver R);
  2. a buffer C, C=(C[0], C[1], . . . , C[T−1]), initially empty, seen as an array of size T+1, where C[i], $0 \leq i \leq T$, denotes the ith position in C;
  3. a current index I, initially pointing to a random position in C, and itself stored at C[T].

Key Generation and Evolution

Figure 5:
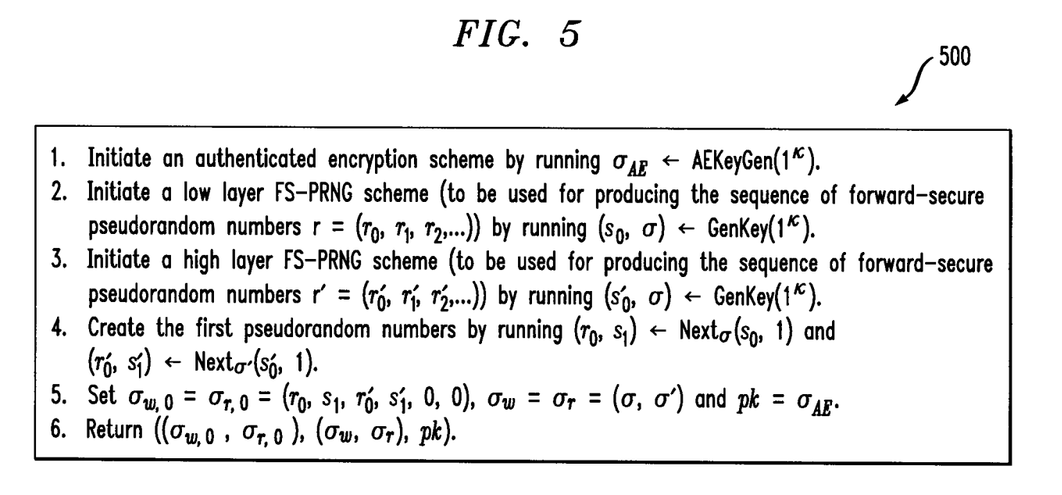
FIG. 5 illustrates pseudo code for an exemplary implementation of a key generation algorithm incorporating aspects of the present invention.

FIG. 5 illustrates pseudo code for an exemplary implementation of the key generation algorithm 500 (KGen). Given the security parameter $\kappa$, the key-generation algorithm KGen first initiates an authenticated encryption scheme as well as two FS-PNGs, one low-layer for producing sequence $r_0, r_1, \ldots$ and one high-layer for producing sequence $r'_0, r'_1, \ldots$. The key-generation algorithm KGen then initializes the secret states of S and R which take the simplified form $(r_i, r'_j, i, j)$, denoting the most recently used pseudorandom numbers for the low and high layer, along with their sequence number. Also, given the current secret state $(r_i, r'_j, i, j)$, an integer t and a control string b$\in$\{low, high\}, the key-evolution algorithm KEvolve creates the corresponding low- or high-layer t-th next forward-secure pseudorandom number.

Figure 6:
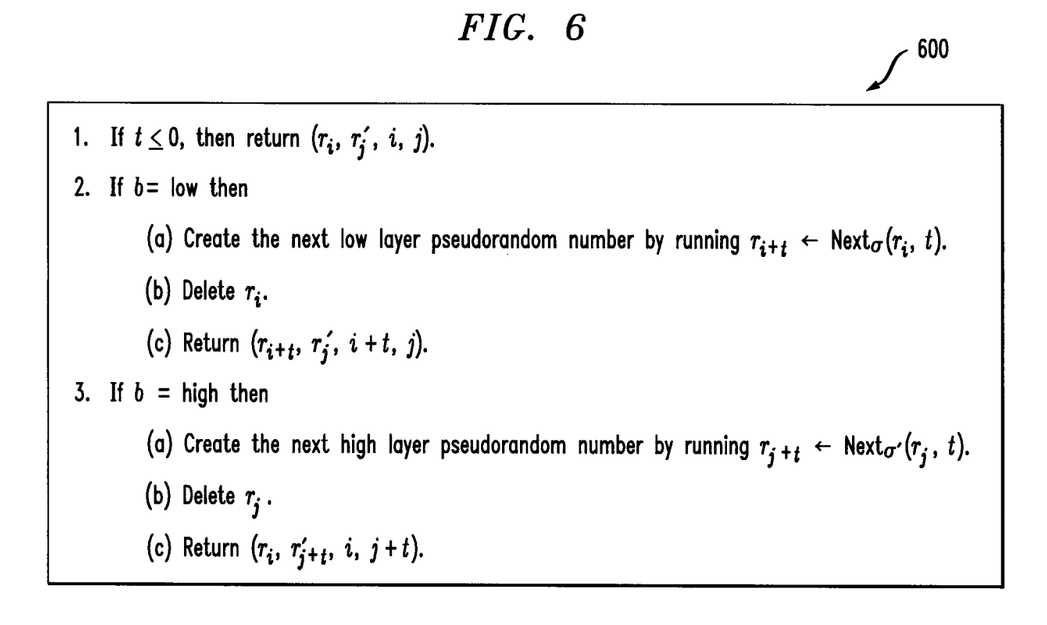
FIG. 6 illustrates pseudo code for an exemplary implementation of a key evolve algorithm incorporating aspects of the present invention.

FIG. 6 illustrates pseudo code for an exemplary implementation of the key evolution: algorithm 600 (KEvolve). Given the current secret writing or reading key $(r_i, r'_j, i, j)$, the corresponding update key $(\sigma, \sigma')$, a step integer t and a control string b, the exemplary key-evolution algorithm KEvolve operates according to the steps shown in FIG. 6.

Write Operation

Figure 7:
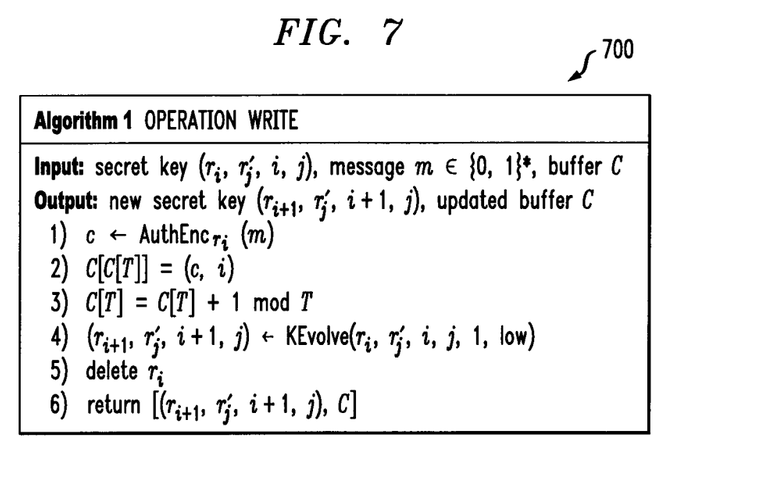
FIG. 7 illustrates pseudo code for an exemplary implementation of a write algorithm incorporating aspects of the present invention.

FIG. 7 provides exemplary pseudo code 700 for an exemplary write operation. As shown in FIG. 7, the write operation receives a secret key $(r_i, r'_j, i, j)$, a message m$\in\{0,1\}^*$, and a buffer C; and securely encodes m, adds the encoded m in C and updates the secret key to generate a new secret key $(r_{i+1}, r'_j, i+1, j)$ and an updated buffer C.

Transmission Operation

Figure 8:
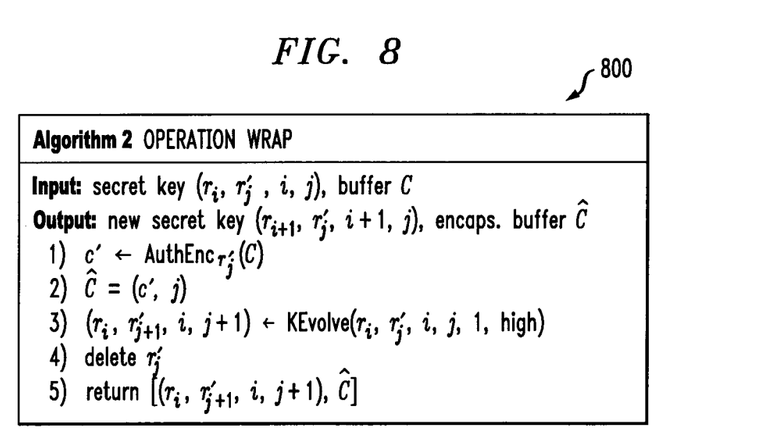
FIG. 8 illustrates pseudo code for an exemplary implementation of a wrap algorithm incorporating aspects of the present invention.

FIG. 8 provides exemplary pseudo code 800 for an exemplary wrap operation. As shown in FIG. 8, the wrap operation Wrap receives the secret key $(r_i, r'_j, i, j)$ and buffer C and Wrap securely encapsulates C to Ĉ and updates the secret key to provide a new secret key $(r_{i+1}, r'_j, i+1, j)$, and encapsulated buffer Ĉ.

Read Operation

Figure 9:
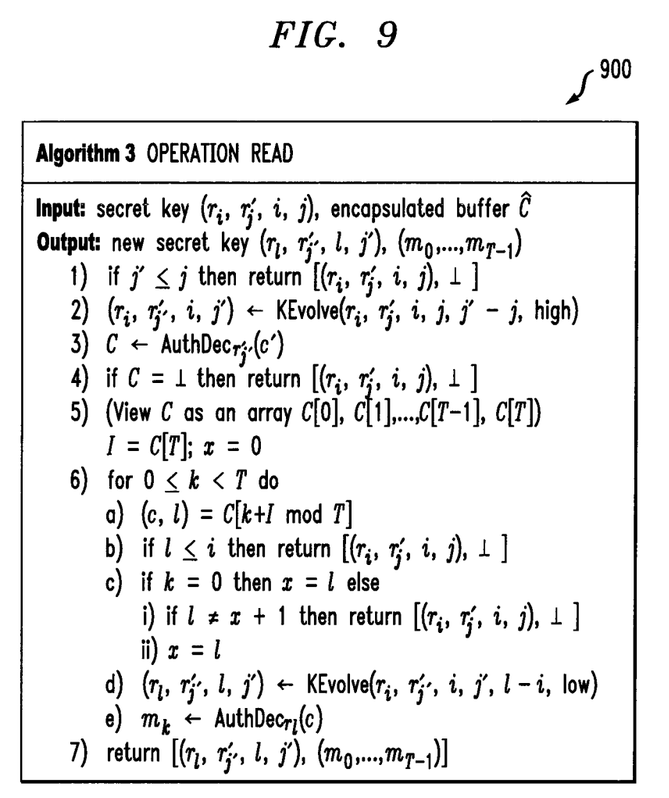
FIG. 9 illustrates pseudo code for an exemplary implementation of a read algorithm incorporating aspects of the present invention.

FIG. 9 provides exemplary pseudo code 900 for an exemplary read operation. As shown in FIG. 9, the read operation Read receives the secret key $(r_i, r'_j, i, j)$ and encapsulated buffer Ĉ=(c', j') and Read decrypts the buffer and all of its contents returning a set of T messages $(m_0, \ldots, m_{T-1})$ and a new secret key j').

Prototype

Host-based components in FIG. 3 depend on an Alerter 310 for detection of events indicating a compromise. As previously indicated, the disclose system is preferably agnostic to the particular implementation of the Alerter 310. In an exemplary implementation, the Alerter 310 is instantiated with Snort configured to log events that may indicate impending compromise.

The buffer data structure is implemented as a class that exports two methods, Write and Wrap. When the host-based application is started it creates a new buffer, which remains held in memory, and interacts with the Bufferer 320 and Transmitter 330. The size of the buffer is specified at creation time, and its starting position is randomly selected.

After creating the buffer, the host application launches two threads, one implementing the Bufferer 320, and the other implementing the Transmitter 330. To achieve independence from the Alerter 310, the Bufferer 320 registers a watch on the log file used by the alerter 310 and grabs any new content when the log is modified. The new content is then encrypted and added to the buffer using the exemplary Write algorithm shown in FIG. 7.

The thread that implements the Transmitter 330 is time-based, waking only after a specified interval has passed. This interval at which buffers are sent to the server 370 is specified at run-time and should be set according to the tradeoffs discussed above. When active, the Transmitter 330 requests an encrypted copy of the buffer and sends that over the network 335 to the server-based components. The Transmitter 330 utilizes the Wrap functionality shown in FIG. 8.

To implement the authenticated encryption, an open-source version of EAX-mode encryption is used. A forward-secure pseudorandom number (FS-PRN) generator is used to generate the necessary encryption keys. Keys are generated for both the message encoding before addition to the buffer, as well as the re-encoding of the buffer before transmission.

The server-based application implements the three receiver functions shown in FIG. 3. The Receiver 340 listens for incoming connections from the Transmitter 330, passing them along to the Decrypter 350 as they arrive. The Decrypter 350 then decrypts the new messages using the Read method described above in the section entitled "Detailed Construction." Once complete, the messages are passed off to the Gap-Checker 360 that raises an alert in the event that the current set of messages does not overlap the previous messages. The Gap-Checker 360 also uses a second thread that wakes on regular intervals to ensure delivery of heartbeat messages. If, when the thread wakes, no messages have been received in the specified window, an alert is raised.

While the exemplary embodiment secures alerts cryptographically in the MLC for transmission to a remote server 370, an alternative embodiment is a trusted receiver situated on the host 305 itself, within a protected environment. A hypervisor (also referred to as a virtual machine monitor (VMM)), for instance, has higher privilege than a guest operating system (OS), isolating it from OS-level exploits. Thus, in an alternate implementation, messages may be transmitted from an SAS 210 to a same-host hypervisor. Hypervisor-based messaging can be blended with even stronger security functionality in which the hypervisor protects an SAS 210 (or other monitoring software) itself against corruption and/or is itself protected by trusted hardware. Where available, a hypervisor-based approach is an alternate or complement to the message-locking channel.

Hypervisor-based approaches, however, have a number of limitations. Many existing hosts and devices are not virtualized and some, e.g., embedded devices, probably will not be for some time. Operating constraints often limit security administrator access to hypervisors. For instance, IT administrators may be able to require that personal devices in the workplace (e.g., laptops, tablets, and smartphones) contain an enterprise-specific VM or application, but they are unlikely to obtain full privileges on such devices. Finally, hypervisors themselves are vulnerable to compromise: A number of researchers have noted that the code sizes, privilege levels, and OS-independence of modern VMMs belie common assertions of superior security over traditional operating systems.

The exemplary MLC construction builds on funkspiel schemes, introduced by Johan Håstad et al., "Funkspiel Schemes: an Alternative to Conventional Tamper Resistance," Proc. of the 7th ACM Conf. on Computer and Communications Security (CCS '00), 125-33 (2000). Funkspiel schemes are much like covert channels, but differ subtly. A funkspiel channel's existence may be known to an adversary. An adversary, however, cannot tell if or when the channel has been used. By implication, an adversary cannot recover message information from the channel either. A funkspiel scheme resists adversaries that see all traffic on the channel and ultimately corrupt the sender.

Funkspiel schemes are designed for a specific use case: Authentication tokens. The transmitter either uses its initialized authentication key or swaps in a new, random one to indicate an alert condition. A funkspiel scheme thus transmits only a single, one-bit message ("swap" or "no swap").

In contrast, MLC messages can be arbitrarily long and travel over any channel. The disclosed MLC construction also incorporates forward security, a form of signer-side cryptographic key refresh that protects the integrity of signed (or MACed) messages even after compromise of the signing (or MACing) key. Most closely related is forward-secure logging, a technique that protects log messages on a host after compromise by an adversary. These schemes do not aim, however, at stealthiness or persistence, key properties in an MLC.

CONCLUSION

As previously indicated, the above-described embodiments of the invention are presented by way of illustrative example only. Numerous variations and other alternative embodiments may be used, as noted above. Existing Security Alerting Systems (SASs) lack countermeasures against sophisticated attackers that take control of an endpoint machine. Often during and always after complete host compromise, an attacker can destroy evidence of its malfeasance and gather intelligence about the instrumentation of the SAS.

Aspects of the present invention provides message-locking channels that advance the state of the art in SAS alert-relaying mechanisms by delivering a secure chain of custody for the stream of security alerts generated by any SAS system. The message-locking channels provide a cryptographic tool capable of transmitting alerts from a host 305 to a security-monitoring server 370 in an integrity-protected, stealthy and persistent manner. According to one exemplary implementation of the invention, an alert cannot be undetectably altered or erased while at rest in the host, and the server either receives the alert or knows it is been lost. At rest or in transit, the message-locking channel does not leak, even in a post-attack environment.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide secure transmission of messages over a silent alarm channel. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed by a host for transmitting an alert message from a Security Alerting System indicating a potential compromise of a protected resource, comprising the steps of:
    obtaining said alert message from said Security Alerting System;
    encrypting said alert message using a single function that implements an authenticated encryption scheme that employs a secret key known by a server, wherein said secret key evolves in a forward-secure manner;
    storing said encrypted alert message in a buffer, wherein said buffer is local to said host and has a fixed size; and
    transmitting said encrypted alert message from said buffer over a communication channel to said server.

2. The method of claim 1, wherein said alert messages permit real-time detection of said potential compromise of said protected resource.

3. The method of claim 1, further comprising the steps of deleting said secret key after use and storing a new secret key.

4. The method of claim 1, wherein said encrypted alert message is maintained in said buffer after said transmitting step.

5. The method of claim 4, further comprising the step of redundantly transmitting said encrypted alert message from said buffer to said server.

6. The method of claim 1, further comprising the step of periodically transmitting one or more encrypted alert messages from said buffer to said server.

7. The method of claim 6, further comprising the step of determining whether said periodic transmissions of said one or more encrypted alert messages from said buffer reach said server.

8. The method of claim 6, wherein said periodic transmissions of said one or more encrypted alert messages from said buffer are transmitted with a period.

9. The method of claim 1, wherein a plurality of said encrypted alert messages is stored in said buffer in a round-robin manner.

10. The method of claim 9, wherein said plurality of said encrypted alert messages is stored in said buffer in said round-robin manner starting from a random entry in said buffer.

11. The method of claim 1, further comprising the step of encrypting a content of said buffer prior to said transmitting step.

12. The method of claim 1, wherein a size and transmission rate of said buffer are selected such that a stream of said encrypted alert messages received by said server introduces a gap that satisfies one or more predefined criteria.

13. The method of claim 1, further comprising the step of detecting a gap rule failure if said server receives two consecutive non-overlapping buffer contents.

14. The method of claim 1, further comprising the step of said server evaluating sequence numbers of a plurality of decrypted alert messages to detect a gap in received alert messages, wherein a content of said buffer is sent to said server using a push transmission model.

15. The method of claim 1, further comprising the step of performing said method in a plurality of enterprise devices and wherein said server comprises a Security Information Event Management (SIEM) system.

16. A method performed by a host for transmitting an alert message from a Security Alerting System indicating a potential compromise of a protected resource, comprising the steps of:
    obtaining said alert message;
    encrypting said alert message using a single function that implements an authenticated encryption scheme that employs a secret key known by a server, wherein said secret key evolves in a forward-secure manner;
    storing said encrypted alert message in a buffer, wherein said encrypted alert message is maintained in said buffer after a transmitting step, wherein said buffer is local to said host and has a fixed size; and
    transmitting said encrypted alert message from said buffer over a communication channel to said server.

17. The method of claim 16, wherein said step of encrypting said alert message comprises one or more of digitally signing said alert message and applying a message authentication code to said alert message.

18. The method of claim 16, wherein said alert messages permit real-time detection of said potential compromise of said protected resource.

19. The method of claim 16, further comprising the step of redundantly transmitting said encrypted alert message from said buffer to said server.

20. The method of claim 16, further comprising the step of periodically transmitting one or more encrypted alert messages from said buffer to said server.

21. The method of claim 16, wherein a plurality of said encrypted alert messages is stored in said buffer in a round-robin manner.

22. The method of claim 21, wherein said plurality of said encrypted alert messages is stored in said buffer in said round-robin manner starting from a random entry in said buffer.

23. The method of claim 16, further comprising the step of encrypting a content of said buffer prior to said transmitting step.

24. The method of claim 16, further comprising the step of detecting a gap rule failure if said server receives contents of two consecutive non-overlapping buffers, wherein said content of said buffer is sent to said server using a push transmission model.

25. The method of claim 16, further comprising the step of said server evaluating sequence numbers of a plurality of decrypted alert messages to detect a gap in received alert messages.

26. A host system for transmitting an alert message from a Security Alerting System indicating a potential compromise of a protected resource, comprising:
    a bufferer to: (i) obtain said alert message from an alerter that generates said alert message when one or more predefined alert rules are violated; (ii) encrypt said alert message using a single function that implements an authenticated encryption scheme that employs a secret key known by a server, wherein said secret key evolves in a forward-secure manner; and (iii) store said encrypted alert message in a buffer, wherein said buffer is local to said host system and has a fixed size; and a transmitter to transmit said encrypted alert message from said buffer over a communication channel to said server, wherein said server comprises a receiver for receiving said buffer from said transmitter and a decrypter for processing said buffer.

27. The host system of claim 26, further comprising a message locking channel between said bufferer and said decrypter, wherein said message locking channel comprises a cryptographic communication channel between said transmitting system and said server.

28. The host system of claim 27, wherein said message locking channel is agnostic to a content of said alert message.

29. The host system of claim 27, wherein said message locking channel provides a mechanism for detection of one or more of modification, reordering and tampering of a plurality of said alert messages in said buffer.

30. The host system of claim 27, wherein said bufferer is further configured to encrypt a content of said buffer prior to transmission by said transmitter.

31. The host system of claim 30, wherein said bufferer encrypts said content of said buffer in response to a Wrap operation from said transmitter.

32. The host system of claim 27, wherein said bufferer updates said secret key in said forward-secure manner.

33. The host system of claim 27, wherein said bufferer receives a Write operation from said alerter to insert said alert message in said buffer.

34. The host system of claim 27, wherein said decrypter performs a cryptographic unwrapping of a received transmitted encrypted alert message.

35. The host system of claim 27, wherein said decrypter verifies an integrity of a received transmitted encrypted alert message.

36. The host system of claim 35, wherein said decrypter generates a message indicating a corruption of said received transmitted encrypted alert message.

37. The host system of claim 35, wherein said decrypter labels constituent encrypted alert messages from said transmitter with buffer sequence numbers.

38. The host system of claim 27, wherein said transmitter interacts with a gap checker at said server that identifies a lost alert message.

39. The host system of claim 38, wherein said lost alert message is generated for one or more of a dropped buffer content and a suppressed buffer content.

40. The host system of claim 38, wherein said lost alert message is generated if an alert message in said buffer is overwritten.

41. The host system of claim 38, wherein said gap checker evaluates sequence numbers of a plurality of decrypted alert messages.

42. A host apparatus for transmitting an alert message from a Security Alerting System indicating a potential compromise of a protected resource, the apparatus comprising:

a memory; and at least one hardware device, coupled to the memory, operative to implement the following steps:

obtain said alert message from said Security Alerting System;

encrypt said alert message using a single function that implements an authenticated encryption scheme that employs a secret key known by a server, wherein said secret key evolves in a forward-secure manner;

store said encrypted alert message in a buffer, wherein said buffer is local to said host apparatus and has a fixed size; and transmit said encrypted alert message from said buffer over a communication channel to said server.

43. The host apparatus of claim 42, wherein said alert messages permit real-time detection of said potential compromise of said protected resource.

44. The host apparatus of claim 42, wherein said encrypted alert message is maintained in said buffer after said transmitting step.

45. The host apparatus of claim 44, wherein one or more encrypted alert messages from said buffer is one or more of redundantly and periodically transmitted to said server.

46. The host apparatus of claim 42, wherein a plurality of said alert messages is stored in said buffer in a round-robin manner.

47. The host apparatus of claim 42, wherein a content of said buffer is encrypted prior to said transmission.

48. The host apparatus of claim 42, wherein said at least one hardware device is further configured to interact with a gap checker at said server that evaluates sequence numbers of a plurality of said alert messages to detect a gap in said alert messages.

49. An article of manufacture comprising a non-transitory machine-readable recordable storage medium for storing one or more software programs to transmit by a host an alert message from a Security Alerting System indicating a potential compromise of a protected resource, wherein the one or more software programs when executed by one or more processing devices implement the following steps:

obtaining said alert message from said Security Alerting System;

encrypting said alert message using a single function that implements an authenticated encryption scheme that employs a secret key known by a server, wherein said secret key evolves in a forward-secure manner;

storing said encrypted alert message in a buffer, wherein said buffer is local to said host and has a fixed size; and transmitting said encrypted alert message from said buffer over a communication channel to said server.

50. The method of claim 1, wherein said buffer has said fixed size regardless of a number of said alert messages.

51. The host system of claim 26, wherein said buffer has said fixed size regardless of a number of said alert messages.

52. The host apparatus of claim 42, wherein said buffer has said fixed size regardless of a number of said alert messages.

* * * * *